United States Patent [19]

Gustafson

[11] Patent Number: 4,588,333
[45] Date of Patent: May 13, 1986

[54] CHIP CUTTING TOOL

[75] Inventor: Manfred W. Gustafson, Malmvägen, Sweden

[73] Assignee: Seco Tools AB, Fagersta, Sweden

[21] Appl. No.: 678,584

[22] Filed: Dec. 5, 1984

[30] Foreign Application Priority Data

Feb. 20, 1984 [SE] Sweden ............................ 8400897

[51] Int. Cl.⁴ ............................................. B26D 1/00
[52] U.S. Cl. ................................... 407/117; 407/72; 407/110
[58] Field of Search ................ 407/117, 110, 72, 50

[56] References Cited

U.S. PATENT DOCUMENTS 207,003  8/1878  Berry .
383,103  5/1888  Cook ................................. 407/72
3,775,818 12/1973 Sirola ................................. 407/110
3,785,021  1/1974 Norgren ............................. 29/96
4,195,956  4/1980 Mihic ................................. 407/117

Primary Examiner—Leonidas Vlachos
Attorney, Agent, or Firm—Burns, Doane, Swecker & Mathis

[57] ABSTRACT

The invention relates to a chip cutting tool comprising at least one cutting insert, which is clamped in a holder body. The insert is clamped by means of the resilient force arising from the bending of a clamping arm which is attached to the holder body. During mounting of the insert the latter slides against the clamping arm, thereby bending same in such a way that a larger bending of the clamping arm occurs during an initial phase of the mounting of the insert than during the final phase of this mounting.

13 Claims, 5 Drawing Figures

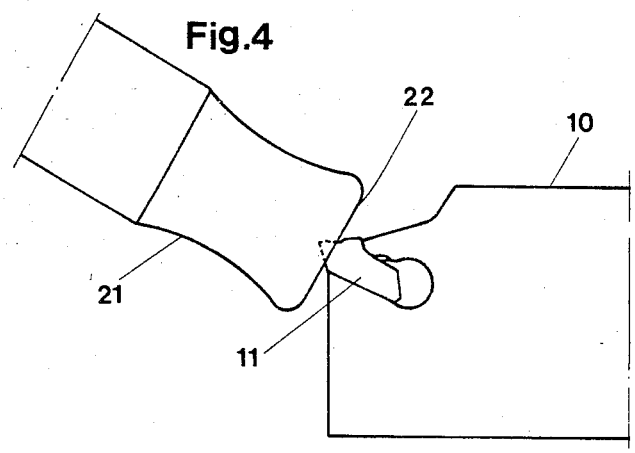
Fig.4
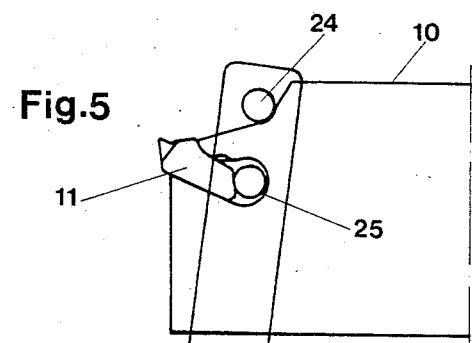
Fig.5
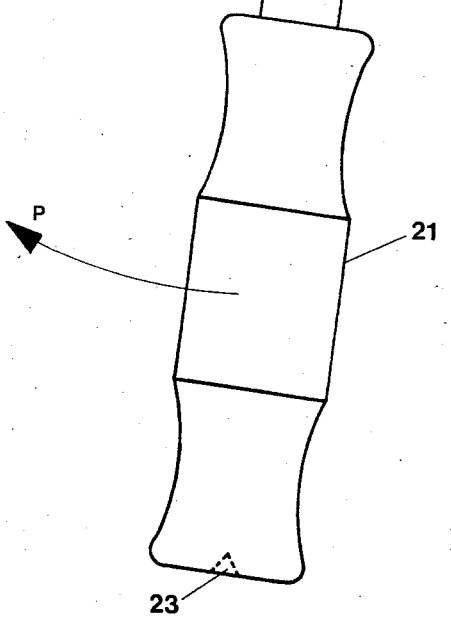

CHIP CUTTING TOOL

The present invention relates to a chip cutting tool, preferably a parting or groove cutting tool, comprising a holder body and a clamping arm which is attached to the holder body, preferably integrally therewith. A cutting insert is clamped by means of the clamping arm in an insert site in the holder body between a first supporting surface on the holder body and a second supporting surface on the clamping arm. The clamping arm is adapted to rest against the cutting insert in a generally bent state and clamp the cutting insert by means of the resilient force arising from the bending of the clamping arm.

A cutting tool of this prior art type is disclosed in SE-B-368785. In this prior art tool, however, the clamping arm has to be bent out by means of a key before insertion of the cutting insert.

The object of the present invention is to provide a tool wherein the cutting insert can be inserted without a preceding bending of the clamping arm.

Cutting tools in which the cutting insert might be inserted in its insert site without preceding bending of a clamping arm are known per se, see for instance DE-U-8001813 and EP-A-59602. In these tools, however, the two supporting surfaces on the clamping arm and the holder body converge. The cutting insert is provided with correspondingly converging supporting surfaces. Thus, no bending of the clamping arm does ever occur, neither before insertion of the cutting insert or in connection therewith. In such a design, disadvantageously, the wedging force acting on the cutting insert does vary from one tool to another depending on tolerance variations of the cooperating supporting surfaces. EP-A-88426 discloses a cutting tool wherein the cutting insert is mounted in a shim, whereupon the shim is inserted into a pocket in the holder. Also in this prior art tool the wedging force acting on the cutting insert does vary due to tolerance variations of the cooperating supporting surfaces. Further, the mounting position of the shim and thus the cutting insert does vary due to these tolerance variations.

Therefore, another object of the invention is to provide a tool in which the cutting inserts in different tools of the same type or in different pockets in one and the same tool are clamped with substantially equal clamping forces.

A further object of the invention is to provide a tool in which the position of the cutting edge of the cutting insert is well-defined, i e not dependent on the above-mentioned tolerance variations.

These and other objects have been attained by giving the invention the characterizing features stated in the appending claims.

The invention is described in detail in the following with reference to the accompanying drawings, in which one embodiment is shown by way of example. It is to be understood that this embodiment is only illustrative of the invention and that various modifications thereof may be made within the scope of the claims.

In the drawings, FIG. 1 shows a side view of one embodiment of a cutting tool according to the invention.

FIGS. 4 and 5 illustrate the insertion and removal of the cutting insert.

Figure 1:
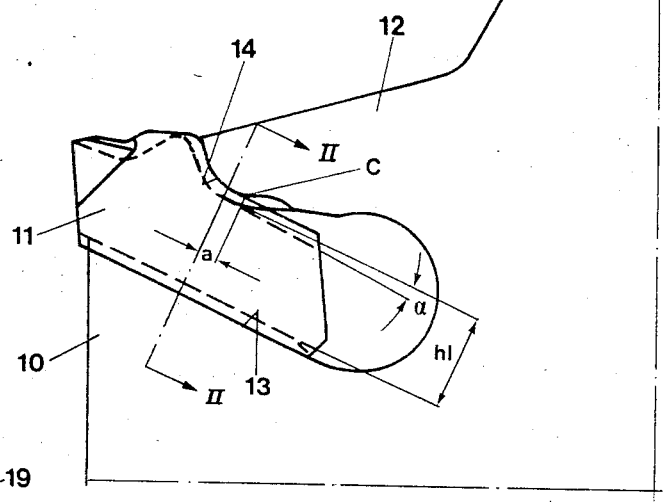
Figure 2:
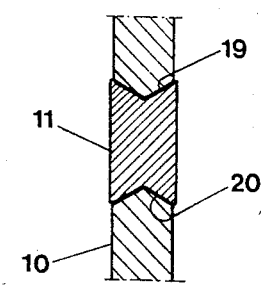
FIG. 2 is a section taken on the line II—II in FIG. 1.

The cutting tool shown in the figures comprises a holder body 10 in form of a thin plate. The holder body 10 is provided with an insert site for a cutting insert 11, suitably made of sintered carbide. The insert site has a supporting surface 13 on the holder body 10 and a supporting surface 14 on a clamping arm 12 which is attached to the holder body 10. The clamping arm 12 can be formed in one piece with the holder body 10, i e be integral therewith or be a separate member fixed to the holder body by for instance welding or riveting. In order to positively secure the cutting insert in its site both the two supporting surfaces 13, 14 and the edge surfaces 19, 20 of the cutting insert cooperating therewith are V-shaped in cross section.

Figure 3:
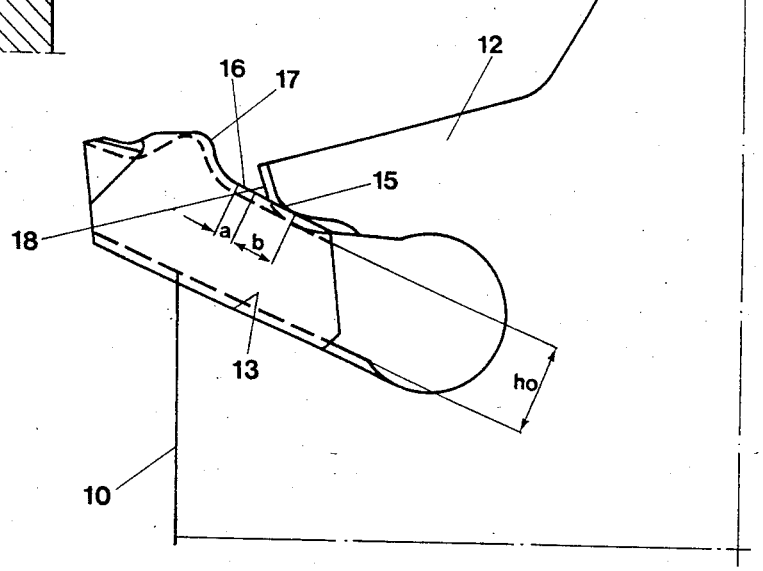
FIG. 3 shows a side view of the tool in FIG. 1, where the cutting insert is in an initial phase of its insertion.

The spacing between the supporting surfaces 13, 14—the distance $h_o$ in FIG. 3—is adapted to the cutting insert such that this distance is somewhat smaller than the largest height of the cutting insert 11 between the edge surfaces 19, 20—the distance $h_1$ in FIG. 1. This means that during insertion of the insert into its site the clamping arm 12 will be bent away from the supporting surface 13, and, thus, the supporting surfaces 13, 14 will be forced apart. When the insert 11 is mounted in its site, thus, the clamping arm 12 is adapted to rest against the insert in a generally bent state and clamp the insert by means of the resilient force arising from the bending of the clamping arm.

In the preferred embodiment the edge surface 19 of the cutting insert opposed to the supporting surface 13 comprises a plurality of mutually inclined portions 15, 16 which are intended to slide into its site while simultaneously bending the clamping arm 12 away from the supporting surface 13.

In the preferred embodiment the rear portion 15 of the edge surface 19, i e the portion thereof cooperating with the supporting surface 14 during the initial phase of the mounting of the insert, is designed such that it forms an acute angle $\alpha$ with the supporting surface 13. Preferably, the angle $\alpha$ is between 2° and 5°, with preference for values in the order of 3°. The angle $\alpha$, thus, provides an entering angle of the insert. When the portion 15 of the insert 11 has been inserted the distance denoted by "b" in FIG. 3 along the supporting surface 14, i e when the initial phase of the mounting of the insert 11 is finished, then the clamping arm 12 has sprung out the distance $h_1-h_0$ when measured at its contact area with the insert. In the preferred embodiment the portion 16 of the edge surface 19 is parallel with the supporting surface 13. Thus, when the portion 16 of the insert 11 during the final phase of the mounting is inserted the distance denoted by "a" in FIGS. 1 and 3 along the supporting surface 14 no further bending of the clamping arm 12 away from the supporting surface 13 occurs. A characterizing feature of the invention is that the mutually inclined portions 15, 16 are designed such that a larger bending of the clamping arm 12 is obtained during the initial phase of the mounting of the insert 11, i e when the rear portion 15 slides against the clamping arm 12, then during the final phase of the mounting, i e when the forward portion 16 slides against the clamping arm 12. The portion 16 does not necessarily have to be parallel with the supporting surface 13. The essential feature is that the transition between the portions 15, 16 forms a breakpoint "c" and that the portion 16 forms an angle with the supporting surface 13 smaller than the angle $\alpha$. Specifically, the angle $\alpha$ can be negative. Further, it is not necessary that the surfaces 15, 16 are planar. These surfaces might be curved, such as convex or concave, by suitably shaping the supporting surface 14. In the preferred embodiment the portion 15, i e the distance "b", is substantially larger than the portion 16, i e the distance "a".

In order to obtain an exactly defined final or mounting position of the insert 11 in the holder body the insert is provided with an abutting surface 17, which is adapted to rest against an end surface 18 on the clamping arm 12. The accuracy of the mounting position is improved by forming the abutting surface 17 and the end surface 18 with a smoothly curved portion. This means that surface contact does arise between the abutting surface 17 and the end surface 18 at this curved portion regardless of the position of the clamping arm 12; i e the bending degree of the clamping arm. In the preferred embodiment the curved portion is located at the transition between the abutting surface 17 and the forward portion 16 on the edge surface 19 of the cutting insert 11, and the curved portion has a constant radius of curvature.

In FIGS. 4 and 5 a key 21 is shown for insertion and removal of the insert 11. The insert is inserted by means of the end surface 22 of the key 21. This end surface is provided with a central recess 23 which is large enough to receive the tip of the insert. The key 21 is also provided with two cross pins 24, 25.

When the insert 11 is to be removed the pin 25 is inserted behind the insert in the insert-receiving pocket in the holder body 10. Then, the pin 24 is adapted to rest against the top side of the holder body. Upon swinging of the key 21 in the direction of the arrow P the insert is pushed out of the pocket by means of the pin 25.

In the embodiment illustrated by way of example the invention is applied on a parting tool. The invention is, however, generally applicable in all types of cutting tools having replaceable inserts, even if it in first hand is intended for thin tools, such as parting tools, slot milling cutters and saws, where there is no room for a clamping mechanism due to the thinness of the tool.

I claim:

1. A chip cutting tool, preferably a parting or groove cutting tool, comprising a holder body, a clamping arm attached to said holder body, preferably integrally therewith, a cutting insert, said cutting insert being clamped by means of said clamping arm in an insert site in said holder body between a first supporting surface on the holder body and a second supporting surface on the clamping arm, said clamping arm being adapted to rest against the cutting insert in a generally bent state and clamp the cutting insert by means of the resilient force arising from the bending of the clamping arm, characterized in that an edge surface of the cutting insert opposed to said first supporting surface comprises a plurality of mutually inclined portions, which are intended to slide against said second supporting surface during insertion of the cutting insert into said insert site while simultaneously bending the clamping arm, said portions being mutually designed such that a larger bending of the clamping arm is obtained during an initial phase of the insertion of the cutting insert than during the final phase thereof, and in that the cutting insert is provided with an abutting surface which is adapted to define the final position of the cutting insert in the holder body by abutment against an end surface on the clamping arm.

2. A tool according to claim 1, wherein the abutting surface comprises a smoothly curved portion, which preferably has a constant radius of curvature.

3. A tool according to claim 1, wherein the end surface comprises a smoothly curved portion, which preferably has a constant radius of curvature.

4. A tool according to claim 1, wherein the abutting surface and the end surface are mutually designed such that surface contact does arise therebetween regardless of the position of the clamping arm.

5. A tool according to claim 1, wherein a first portion on the edge surface of the cutting insert forms a first angle $\alpha$ with the first supporting surface, said first portion sliding against the supporting surface on the clamping arm during the initial phase of the insertion of the cutting insert.

6. A tool according to claim 5, wherein the first angle $\alpha$ is between 2° and 5°, with preference for values in the order of 3°.

7. A tool according to claim 5, wherein a second portion on the edge surface of the cutting insert forms a second angle with the first supporting surface, said second portion sliding against the supporting surface on the clamping arm during the final phase of the insertion of the cutting insert, and said second angle being smaller than said first angle $\alpha$.

8. A tool according to claim 7, wherein the second angle is in the order of 0°.

9. A tool according to claim 5, wherein the first portion on the edge surface of the cutting insert is substantially longer than the second portion thereon.

10. A tool according to claim 7, wherein the abutting surface and the end surface are designed such that the surface contact does arise at a radiused transition portion between the abutting surface and the second portion on the edge surface of the cutting insert.

11. A tool according to claim 2, wherein the abutting surface and the end surface are mutually designed such that surface contact does arise therebetween regardless of the position of the clamping arm.

12. A tool according to claim 3, wherein the abutting surface and the end surface are mutually designed such that surface contact does arise therebetween regardless of the position of the clamping arm.

13. A tool according to claim 6, wherein a second portion on the edge surface of the cutting insert forms a second angle with the first supporting surface, said second portion sliding against the supporting surface on the clamping arm during the final phase of the insertion of the cutting insert, and said second angle being smaller than said first angle $\alpha$.

* * * * *